Patented Oct. 28, 1930

1,780,149

UNITED STATES PATENT OFFICE

DONALD H. POWERS, OF PENNS GROVE, NEW JERSEY, ASSIGNOR TO E. I. DU PONT DE NEMOURS & COMPANY, OF WILMINGTON, DELAWARE, A CORPORATION OF DELAWARE

PROCESS OF VULCANIZING RUBBER AND ACCELERATOR THEREFOR

No Drawing. Application filed January 26, 1926. Serial No. 83,952.

This invention relates to the vulcanization of rubber or similar materials such as balata, gutta percha and rubber substitutes. It is more particularly directed to vulcanization of rubber at lower temperatures than are ordinarily used; employing the derivatives, and preferably the aldehyde derivatives, of condensation products of amines and aldehydes.

One object of this invention is to provide a process for the vulcanization of rubber involving the use of a material which shall require a shorter time of cure, and will not cause over-vulcanization as do other accelerators well known in the art. Another object is to provide a process according to which a finished vulcanized product may be obtained possessing a maximum tensile strength throughout a wide range of cures.

It is well known that aldehyde-amines in general possess accelerating value and may be used over a limited range of conditions, usually vulcanizing at forty pounds steam pressure. I have now discovered that by using as accelerators certain new classes of compounds of the general type mentioned above, it is possible to effect vulcanization at materially lower temperatures than have heretofore been commonly used. With these new accelerators, I have found it possible to obtain vulcanization over a long range of time at a temperature of 120° C.; and they possess this further advantage that below 100° C. they show but slight vulcanizing action, with the result that they are free from the scorching properties which characterize, and detract from the value of, a great many of the accelerators used at the present time. This new class of accelerators which possess the abovementioned desirable properties are compounds resulting from the action of an aldehyde on the condensation product of an aliphatic aldehyde and an aliphatic amine.

For practical reasons I prefer to use as accelerators those compounds which may be produced by causing the condensation product of an aliphatic amine and an aliphatic aldehyde to react with formaldehyde. Good results have also been obtained, however, when the formaldehyde has been replaced by various other aliphatic aldehydes such as butyraldehyde.

The condensation product on which an aliphatic aldehyde is caused to react according to my invention may be designated generally as an alkylidene-alkyl-amine. It may be described as the condensation product of one molecular proportion of an aliphatic aldehyde, preferably containing more than one carbon atom, with one molecular proportion of an aliphatic amine. The resulting alkylidene-alkyl-amine has most probably the following general graphical formula: $R=N-R'$ where R stands for an alkylidene radical, and R' represents an alkyl group.

The product obtained by causing an aliphatic aldehyde to act on the above described alkylidene-alkyl-amine appears to have a rather complex molecular structure the exact nature of which has not as yet been ascertained.

As examples of these new accelerators, the following may be cited, it being understood, of course, that these examples are merely typical:

Ethylidene-ethyl-amine treated with formaldehyde.

Ethylidene-methylamine treated with formaldehyde.

Ethylidene-butylamine treated with formaldehyde.

Propylidene-ethanol-amine treated with formaldehyde.

Propylidene-propyl-amine treated with formaldehyde.

Methylene-amyl-amine treated with formaldehyde.

Butylidene-butylamine treated with formaldehyde.

Butylidene-methylamine treated with formaldehyde.

Heptylidene-methylamine treated with formaldehyde.

Heptylidene-ethyl-amine treated with formaldehyde.

Heptylidene-iso-propyl-amine treated with formaldehyde.

Methylene-iso-propyl-amine treated with butyraldehyde.

Methylene-ethyl-amine treated with heptaldehyde.

The amount of aldehyde which is usually treated with alkylidene-alkyl-amine is from one to two moles of aldehyde with two moles of the alkylidene-alkyl-amine.

A preferred method of preparation may be illustrated as follows:

Example I

One hundred pounds of acetaldehyde is cooled to 10° C. and three hundred and forty pounds of 30% ethyl-amine is slowly added, keeping the solution cooled to 20° C. When the addition is complete the alkylidene-alkyl-amine solution is warmed to 50° C. Two hundred and fifty pounds of 37% formaldehyde is rapidly run in. A vigorous heat of reaction is noted and care used to avoid overheating. The resulting product, obtained by this action of formaldehyde on ethylidene-ethyl-amine, separates as a light yellow oil.

In applying these new accelerators to the vulcanization of rubber, I preferably employ from 0.25 to 0.75 parts of the accelerator for 100 parts of rubber mixed with 3 parts of zinc oxide and 3.5 parts of sulphur. These substances are mixed together by milling on the rolls in the usual manner, and vulcanizing in a press under thirty pounds steam pressure for thirty minutes.

Using as the specific accelerator the ethylidene-ethyl-amine-formaldehyde reaction product produced as described in Example I above, in a rubber mix such as that just described, and curing for thirty minutes at thirty pounds steam pressure, there was obtained a stock having a tensile strength close to three thousand pounds (2970) when one per cent. of the accelerator was used.

Example II

One hundred and fifty pounds of forty per cent. monomethylamine is slowly added to two hundred and twenty-five pounds of heptaldehyde. The alkylidene-alkyl-amine was treated with eighty-five pounds of thirty-seven per cent. formaldehyde. The resulting product is a colorless water-insoluble oil which is readily separated.

This product was tested in a stock containing 100 parts of rubber, 3 parts of zinc oxide, 3.5 parts of sulfur and .375 parts of this accelerator. When cured for thirty minutes at twenty-five pounds steam pressure, a product having a tensile strength of over 4,400 pounds (4,456) per square inch is obtained.

Although the accelerators described herein are in general the reaction products of aldehydes and alkylidene-alkyl-amines, I have found of special value those accelerators obtainable by the action of an aliphatic aldehyde having from one to seven carbon atoms on an alkylidene-alkyl-amine in which the alkylidene and the alkyl radicals each has from one to seven carbon atoms. For the aliphatic aldehyde, formaldehyde is considered preferable; and by "formaldehyde" I include paraformaldehyde and various other forms of polymerized formaldehyde which are equivalent to, and which may be used in place of, formaldehyde itself.

My new accelerators are in general differentiated from the ethylidene-aniline-aldehyde accelerators described in United States Patent No. 1,467,984 to North by the fact, among others, that they can effect satisfactory vulcanization at a steam pressure of thirty pounds or less, compared with a steam pressure of forty pounds for the ethylidene-aniline-aldehyde type shown in said North patent.

I claim:

1. A rubber-vulcanization accelerator comprising the product resulting from the action of an aldehyde on the condensation product of an aliphatic aldehyde and an aliphatic amine.

2. A rubber-vulcanization accelerator comprising the product resulting from the action of an aldehyde on the condensation product of one mole of an aliphatic aldehyde and one mole of an aliphatic amine.

3. A rubber-vulcanization accelerator comprising the product resulting from the action of an aliphatic aldehyde on the condensation product of an aliphatic aldehyde and an aliphatic amine.

4. A rubber-vulcanization accelerator comprising the reaction product of an aldehyde and an alkylidene-alkyl-amine.

5. A rubber vulcanization accelerator comprising the reaction product of an aliphatic aldehyde and an alkylidene-alkyl-amine, said product when used as an accelerator making possible the production of a satisfactory vulcanized rubber by vulcanizing a rubber mix for less than an hour at not more than thirty pounds steam pressure.

6. A rubber-vulcanization accelerator comprising the reaction product of from one to two moles of an aliphatic aldehyde and two moles of an alkylidene-alkyl-amine.

7. A rubber-vulcanization accelerator comprising the reaction product of from one to two moles of a straight chain aldehyde and two moles of an alkylidene-alkyl-amine.

8. A rubber-vulcanization accelerator comprising the reaction product of an aliphatic aldehyde and an alkylidene-alkyl-amine, said aldehyde, and said alkylidene and said alkyl radicals, each having from one to seven carbon atoms.

9. As a rubber-vulcanization accelerator, the product obtainable by the action of from one to two moles of formaldehyde on two moles of an alkylidene-alkyl-amine.

10. As a rubber-vulcanization accelerator, the product obtainable by the action of an aldehyde on an heptylidene-alkyl-amine.

11. As a rubber-vulcanization accelerator, the product obtainable by the action of an aliphatic aldehyde having from one to seven carbon atoms on an heptylidene-alkyl-amine.

12. As a rubber-vulcanization accelerator, the product obtainable by the action of from one to two moles of formaldehyde on two moles of an heptylidene-alkyl-amine.

13. As a rubber-vulcanization accelerator, the product obtainable by the action of from one to two moles of formaldehyde on two moles of an heptylidene-alkyl-amine, said alkyl radical having from one to seven carbon atoms.

14. The process of making a vulcanization-accelerator which comprises condensing an aliphatic aldehyde with an aliphatic primary amine, and treating the resulting condensation product with an aliphatic aldehyde.

15. The process of making a vulcanization-accelerator which comprises condensing two moles of an aliphatic aldehyde having from one to seven carbon atoms with about two moles of an aliphatic amine, and causing the resulting condensation product to react with from one to two moles of formaldehyde while cooling to prevent overheating.

16. The process of treating rubber which comprises combining rubber with a vulcanizing agent and with an accelerator comprising the reaction product of an aldehyde and an alkylidene-alkyl-amine, and vulcanizing the rubber mix.

17. The process of treating rubber which comprises combining rubber with a vulcanizing agent and with an accelerator comprising the reaction product of an aliphatic aldehyde and an alkylidene-alkyl-amine in which the alkylidene group has from one to seven carbon atoms, and vulcanizing the rubber mix.

18. The process of treating rubber which comprises combining rubber with a vulcanizing agent and with an accelerator comprising the reaction product of formaldehyde and an alkylidene-alkyl-amine, and vulcanizing the rubber mix.

19. The process of treating rubber which comprises combining rubber with a vulcanizing agent and with an accelerator comprising the reaction product of formaldehyde and an alkylidene-alkyl-amine in which the alkyl and alkylidene radicals each have from one to seven carbon atoms, and vulcanizing the rubber mix.

20. The process of treating rubber which comprises combining rubber with a vulcanizing agent and with an accelerator comprising the reaction product of from one to two moles of formaldehyde and two moles of an alkylidene-alkyl-amine, and vulcanizing the rubber mix.

21. A process as defined in claim 20 in which the alkyl and alkylidene radicals of the alkylidene-alkyl-amine each have from one to seven carbon atoms.

22. A rubber product obtainable by combining rubber with sulphur and with the reaction product of an aldehyde and an alkylidene-alkyl-amine, and vulcanizing the mixture.

23. A rubber product comprising rubber mixed with sulphur and with the reaction product of an aliphatic aldehyde and an alkylidene-alkyl-amine, and vulcanized.

24. A rubber product comprising rubber mixed with sulphur, zinc oxide, and the reaction product of from one to two moles of formaldehyde and two moles of an alkylidene-alkyl-amine, and vulcanized.

25. A rubber product as defined in claim 24 in which the alkyl and alkylidene radicals of the alkylidene-alkyl-amine each have from one to seven carbon atoms.

26. A rubber-vulcanization accelerator comprising the product resulting from the interaction of 1 mole of aliphatic amine and more than 1 mole of an aliphatic aldehyde.

27. A rubber-vulcanization accelerator comprising the product resulting from the interaction of from 3 to 4 moles of aliphatic aldehyde with 2 moles of aliphatic amine.

28. A rubber-vulcanization accelerator comprising the product resulting from the interaction of formaldehyde, an aliphatic aldehyde containing a plurality of carbon atoms and a primary aliphatic amine.

29. A rubber-vulcanization accelerator comprising the product resulting from the interaction of 1 to 2 moles of formaldehyde, 1 mole of aliphatic aldehyde containing a plurality of carbon atoms and 1 mole of a primary aliphatic amine containing from 1 to 7 carbon atoms.

30. A rubber-vulcanization accelerator comprising the product resulting from the interaction of formaldehyde, heptaldehyde and mono-methyl-amine.

31. A rubber product obtainable by combining rubber with a vulcanizing agent and with the reaction product of an aliphatic aldehyde and a primary aliphatic amine, and thereafter vulcanizing.

32. A rubber product obtainable by combining rubber with a vulcanizing agent and with the reaction product of an aliphatic aldehyde containing from 1 to 7 carbon atoms and a primary aliphatic amine containing from 1 to 7 carbon atoms, and thereafter vulcanizing.

33. A rubber product obtainable by combining rubber with a vulcanizing agent and with the reaction product of 1 mole of an aliphatic amine and more than 1 mole of an aliphatic aldehyde, and thereafter vulcanizing.

34. A rubber product obtainable by combining rubber with a vulcanizing agent and with the reaction product of formaldehyde, an aliphatic aldehyde containing a plurality of carbon atoms and a primary aliphatic amine, and thereafter vulcanizing.

35. A rubber product obtainable by combining rubber with a vulcanizing agent and with the reaction product of 1 to 2 moles of formaldehyde, 1 mole of aliphatic aldehyde containing a plurality of carbon atoms and 1 mole of a primary aliphatic amine containing from 1 to 7 carbon atoms, and thereafter vulcanizing.

36. A rubber product obtainable by combining rubber with a vulcanizing agent and with the reaction product of heptaldehyde, mono-methyl-amine and formaldehyde.

In testimony whereof I affix my signature.

DONALD H. POWERS.